United States Patent
Nakashima et al.

(10) Patent No.: US 7,894,674 B2
(45) Date of Patent: Feb. 22, 2011

(54) IMAGE-PROCESSING METHOD AND APPARATUS, AND PRINTER INCLUDING ENHANCEMENT OF HEAD HAIR

(75) Inventors: Teruyoshi Nakashima, Asaka (JP); Yukiya Miyachi, Tokyo (JP); Toru Matama, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1002 days.

(21) Appl. No.: 11/727,377

(22) Filed: Mar. 26, 2007

(65) Prior Publication Data
US 2007/0223829 A1    Sep. 27, 2007

(30) Foreign Application Priority Data
Mar. 27, 2006  (JP)  ............................. 2006-086459

(51) Int. Cl.
*G06K 9/46* (2006.01)
(52) U.S. Cl. .................. 382/190; 382/118; 382/181
(58) Field of Classification Search ................ 382/115, 382/118, 124, 181, 231
See application file for complete search history.

(56) References Cited

U.S. PATENT DOCUMENTS

| 6,661,906 | B1 * | 12/2003 | Kawade et al. | ............... 382/118 |
| 7,068,835 | B1 * | 6/2006 | Ban et al. | .................... 382/154 |
| 2005/0063582 | A1 * | 3/2005 | Park et al. | .................... 382/154 |

FOREIGN PATENT DOCUMENTS

| JP | 2004-109642 A | 4/2004 |
| JP | 2005-267410 A | 9/2005 |

* cited by examiner

*Primary Examiner*—Brian Q Le
*Assistant Examiner*—Edward Park
(74) *Attorney, Agent, or Firm*—Birch, Stewart, Kolasch & Birch, LLP

(57) ABSTRACT

An image processing method, comprising the steps of:
  extracting an area of head hair from a digital image obtained by shooting a human face;
  extracting an area of a head-top portion based on the shape of the extracted area of head hair; and
  applying image processing, which enhances illumination effect on the head hair, to the digital image, by use of information on the extracted area of a head-top portion.

19 Claims, 7 Drawing Sheets

(INPUT IMAGE)

LABEL NUMBER 1  LABEL NUMBER 2  LABEL NUMBER n (BINARY IMAGE)

(BINARY IMAGE OF THE AREA OF HEAD-HAIR PORTION)

(OUTPUT IMAGE)

IMAGE-PROCESSING METHOD AND APPARATUS, AND PRINTER INCLUDING ENHANCEMENT OF HEAD HAIR

BACKGROUND OF THE INVENTION

1. Field of the Invention

The present invention relates to an image processing method, an image processing apparatus, and a printer, and more particularly to a technique for enhancing the glossiness of human head hair.

2. Description of the Related Art

To date, photo print apparatus has been proposed in which a high-quality photo can be created in a manner such that a light ring like an angel halo is rendered above human head hair (Japanese Patent Application Laid-Open No. 2004-109642).

A system disclosed in Japanese Patent Application Laid-Open No. 2004-109642 is designed in such a way that a ceiling strobe is arranged in the vicinity of a human head and the utilized strobe can irradiate a light beam focusing on a region that is smaller than the head, whereby the picture quality of the human head hair can be enhanced.

Additionally, a method has been proposed in which the extent of color conversion can be changed depending on the size of a color area, and, in particular, without changing the color of pupils whose areas are small, only the color of human head hair whose area is large can be changed into brown (Japanese Patent Application Laid-Open No. 2005-267410).

An illumination light beams from a light source are reflected on the top of a human head, thereby enabling the glossiness of head hair to be enhanced, whereby a preferable photo print may be created. In particular, in a photo print creation system installed in a video arcade or the like, by, for example, contriving a strobe system (mounting a strobe on the ceiling), thereby making strobe light beams to be reflected on the top of a human head (including the creation of a light ring like an angel halo), a preferable photo print is created.

However, due to insufficient illumination, adequate reflection may not be obtained when a picture is taken; additionally, the installation of an extra (expensive) strobe system as disclosed in Japanese Patent Application Laid-Open No. 2004-109642 may be difficult from the view point of cost or due to no availability for an installation place.

In contrast, according to the invention disclosed in Japanese Patent Application Laid-Open No. 2005-267410, the extent of color conversion can be changed depending on the size of a color area; however, the glossiness of human head hair is not enhanced.

SUMMARY OF THE INVENTION

The present invention has been implemented in consideration of the foregoing situation; an object of the present invention is to provide an image processing method, an image processing apparatus, and a printer in which the glossiness of human head hair and the like can be enhanced without utilizing any extra strobe system, whereby a preferable photo print can be created.

In order to achieve the foregoing object, an image processing method according to a first aspect of the present invention is characterized by including the steps of extracting an area of head hair from a digital image obtained by shooting a human face; extracting an area of a head-top portion based on the shape of the extracted area of head hair, and applying image processing, which enhances illumination effect on the head hair, to the digital image, by use of information on the extracted area of a head-top portion.

In other words, the area of the head-top portion of human head hair is automatically extracted, and then image processing, which enhances an illumination effect on the head hair, is performed by use of information on that area. In particular, the effect of an angel halo can be enhanced, whereby the glossiness of the head hair can be raised without utilizing any extra strobe system.

An image processing method according to a second aspect of the present invention is characterized by including the steps of extracting an area of head hair from a digital image obtained by shooting a human face; extracting an area of a head-top portion, based on the shape of the extracted area of head hair; creating a blurred image, based on an image in the extracted area of a head-top portion; and applying image processing, which enhances illumination effect on the head hair, to the digital image, by use of information on the created blurred image.

According to the second aspect of the present invention, the smooth continuity between the area of the head-top portion and the other portion to which the image processing is not applied can be achieved, by blurring the image in the area of the head-top portion.

As set forth in a third aspect of the present invention, in the image processing method set forth in the second aspect, the process of applying image processing is characterized by applying at least one image processing item among image processing items including color conversion, contrast enhancement, and edge enhancement to a digital image in the area of the created blurred image, with a gradation value of the created blurred image utilized as a parameter.

The respective gradation values, of the created blurred image, at the center portion and the peripheral portion of the extracted area of the head-top portion differ from each other. Accordingly, by performing image processing with the gradation value of the blurred image utilized as a parameter, it is made possible to make the respective extents of the image processing at the center portion and the peripheral portion of the area of the head-top portion differ from each other (e.g., the center portion is strongly processed, and the peripheral portion is weakly processed so that the smooth continuity between the processed portion and unprocessed portion can be achieved).

As set forth in a fourth aspect of the present invention, in the image processing method set forth in any one of the first to the third aspect, the process of extracting an area of head hair is characterized by including the step of creating a blurred image based on the digital image; the step of creating a binary image by binarizing the created blurred image; and the step of extracting an area, having a characteristic parameter for head hair, which is a black-pixel area in the created binary image.

As described above, by creating a blurred image based on a digital image, the blurred image can satisfactorily be binarized in later-stage binarization processing. The black-pixel area, among black-pixel areas in the binary image binarized as described above, which has a characteristic parameter (especially, an area and a shape) for head hair is extracted as the area of head hair.

As set forth in a fifth aspect of the present invention, in the image processing method set forth in any one of the first to the fourth aspect, the process of extracting an area of a head-top portion is characterized by including the step of obtaining the sum of black pixels, in a binary image that has black pixels only in the area of head hair, in each horizontal line in the vertical direction; the step of determining that a line position where the sum of black pixels drastically increases and a line position where the sum of black pixels drastically decreases are the position of the top of the head and the position of the boundary between the head hair and the forehead, respectively; and the step of obtaining the longitudinal range of the area of a head-top portion, based on the determined position of the top of the head and the determined position of the boundary between the head hair and the forehead.

In other words, the sum of black pixels, in a horizontal direction, of a binary image having black pixels only in an area of head hair drastically increases when a specific horizontal line in the binary image changes its position from a line position in the background area to a line position in the head-hair area. In contrast, the sum of black pixels drastically decreases when the specific horizontal line in the binary image changes its position from a line position in the head-hair area to a line position in the forehead area. The respective line positions of the changing points are defined as the position of the head top and the position of the boundary between the head hair and the forehead. In addition, the longitudinal range of the area of a head-top portion is obtained, based on the head-top position and the position of the boundary between the head hair and the forehead, which have been determined as described above. For example, the longitudinal range of the area of a head-top portion is defined as the range, between the head-top position and the position of the boundary between the head hair and the forehead, which falls within a predetermined range with respect to the head top.

As set forth in a sixth aspect of the present invention, in the image processing method set forth in any one of the first to the fourth aspect, the process of extracting an area of a head-top portion is characterized by including the step of obtaining the sum of black pixels, in a binary image that has black pixels only in the area of head hair, in each horizontal line in the vertical direction; the step of determining that a line position where the sum of black pixels drastically increases and a line position where the sum of black pixels drastically decreases are the position of the top of the head and the position of the boundary between the head hair and the forehead, respectively; the step of obtaining the longitudinal range of the area of head-top portion, based on the determined position of the top of the head and the determined position of the boundary between the head hair and the forehead; the step of obtaining, in the longitudinal range of the area of head-top portion, the gravity center of black pixels in each line in the binary image; and the step of obtaining, as a lateral range of the area of the head-top portion, the length, with respect to the gravity center of each line, whose ratio to the length of black pixels in the line is constant.

In the sixth aspect, the lateral range of the area of a head-top portion is further obtained. That is to say, in the longitudinal range of the area of a head-top portion, the gravity center of black pixels, in each line, in the binary image is obtained, and then, the length, with respect to the gravity center of each line, whose ratio to the length of black pixels in the line is constant is defined as the lateral range of the area of the head-top portion. Accordingly, the lateral range of the area of a head-top portion varies line by line, depending on the shape of the area of head hair.

An image processing apparatus according to a seventh aspect of the present invention is characterized by including a head-hair area extracting device which extracts an area of head hair from a digital image obtained by shooting a human face; a head-top-portion area extracting device which extracts an area of a head-top portion, based on the shape of the extracted area of head hair; and an image processing device which applies image processing, which enhances illumination effect on the head hair, to the digital image, by use of information on the extracted area of a head-top portion.

An image processing apparatus according to an eighth aspect of the present invention is characterized by including a head-hair area extracting device which extracts an area of head hair from a digital image obtained by shooting a human face; a head-top-portion area extracting device which extracts an area of a head-top portion, based on the shape of the extracted area of head hair; a blurred image creation device which creates a blurred image, based on an image in the extracted area of a head-top portion; and an image processing device which applies image processing, which enhances illumination effect on the head hair, to the digital image, by use of information on the created blurred image.

As set forth in a ninth aspect of the present invention, in the image processing apparatus set forth in the eighth aspect, the image processing apparatus is characterized in that at least one image processing item among image processing items including color conversion, contrast enhancement, and edge enhancement is applied to a digital image in the area of the created blurred image, with a gradation value of the created blurred image utilized as a parameter.

A printer according to a tenth aspect of the present invention is characterized by including the image processing apparatus set forth in any one of the seventh to the ninth aspect; and a printing device which prints on a printing paper sheet an image to which the image processing apparatus has applied image processing. According to the printer, a preferable photo print, in which the glossiness, the texture, and the like of head hair are perceivable, can be obtained.

As set forth in a eleventh aspect of the present invention, the printer set forth in the tenth aspect is characterized by further comprising a camera which obtains a digital image by shooting a person.

According to the present invention, the area of the head-top portion of human head hair is automatically extracted, and then image processing, which enhances an illumination effect on the head hair, is performed by use of information on that area; therefore, the glossiness, the texture, and the like of the head hair can be raised without utilizing any specific strobe system.

DETAILED DESCRIPTION OF THE PREFERRED EMBODIMENTS

A preferred embodiment for an image processing method, an image processing device, and a printer according to the present invention will be explained in detail below, with reference to the accompanying drawings.

Figure 1:
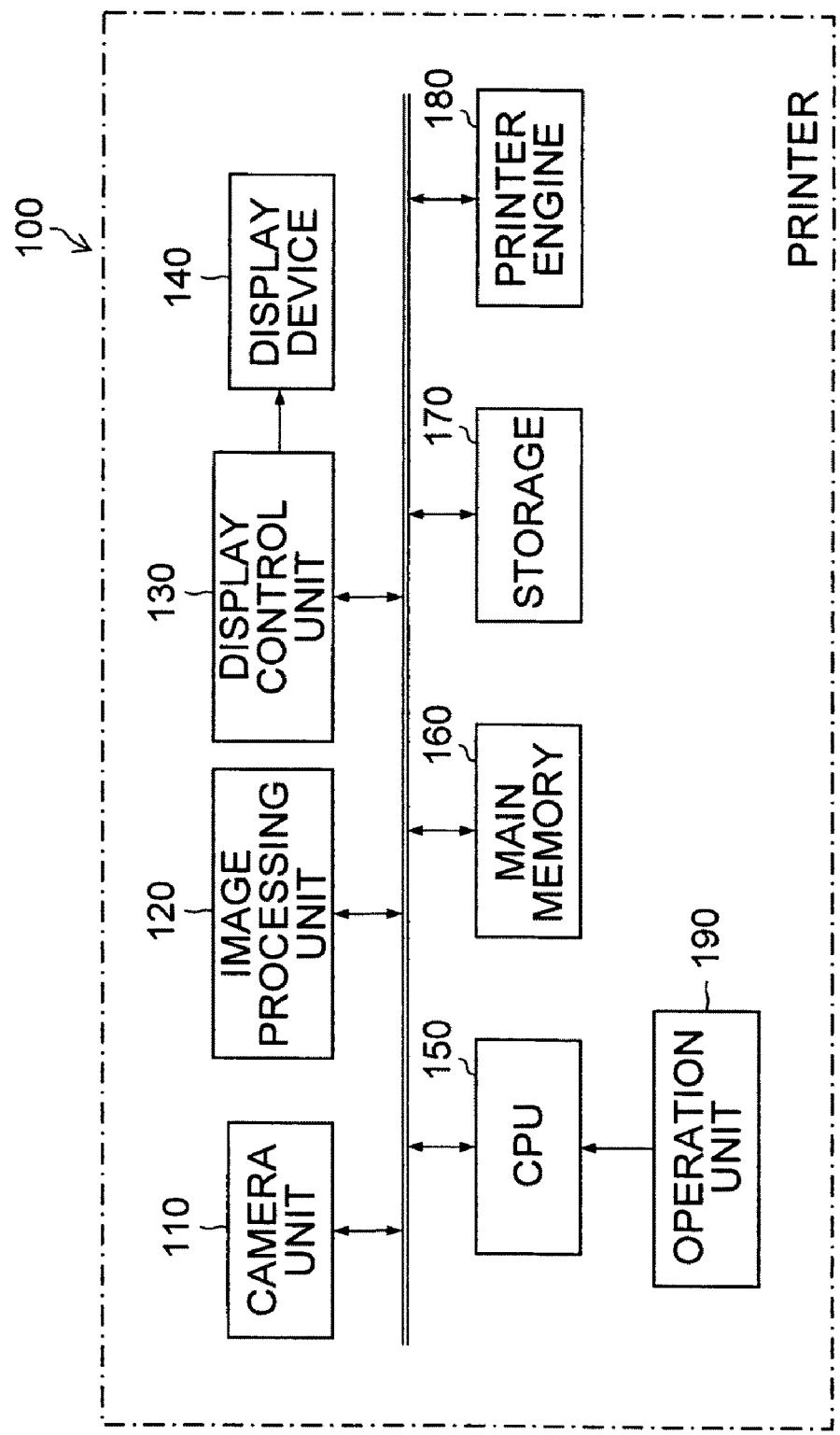
FIG. 1 is a block diagram illustrating an embodiment of a printer according to the present invention.

FIG. 1 is a block diagram illustrating an embodiment of a printer according to the present invention.

As illustrated in FIG. 1, a printer 100 according to the present embodiment is an amusement seal printer installed in a video arcade or at a store front; the printer 100 is configured with a camera unit (an image data input unit) 110, an image processing unit 120, a display control unit 130, a display device 140, a central processing unit (CPU) 150, a main memory 160, a storage 170, a printer engine 180, and an operation unit 190.

The camera unit 110 takes an image of the face of a user and outputs digital color image data (R, G, and B signals). The image processing unit 120 has a function of performing image processing (hereinafter, referred to as "head-hair processing") according to the present invention, based on the R, G, and B signals outputted from the camera unit 110; a function of performing synthesis processing of a user-face image and a preliminarily prepared template image, a graffiti, or the like; a function of creating printing data, based on the data of the synthesized image; and the like. In addition, the details of the head-hair processing will be described later.

The image processing unit 120 converts the R, G, and B signals, which have undergone various kinds of image processes, into a Y, M, and C (yellow, magenta, and cyan) signal, and then outputs the converted Y, M, and C signals to the printer engine 180.

The display control unit 130 creates, based on image data (image data for a moving picture) inputted from the camera unit 110, display image data for displaying a user-face image on the display device 140, and then outputs the display image data to the display device 140 to display an image on the display device 140, or display a synthesis image, in which the user-face image and a preliminarily prepared template image have been synthesized, on the display device 140.

The CPU 150 is a processing unit for integrally controlling the whole system; through the CPU 150, various kinds of instructions, such as an image pickup instruction to the camera unit 110, an instruction of reading image data from the camera unit 110, an instruction of processing the read image data, an instruction, to respective control blocks, of receiving and transmitting the image data, and an instruction of printing an image, are issued. The various instructions to the CPU 150 are issued by the operation unit 190, based on the manipulation by a user. For example, the operation unit 190 has a button for issuing a selection instruction to select a template image utilized for image synthesis, while viewing template images displayed on the display device 140; a button for selecting a printing type for a photo print to be outputted; and the like. In addition, the operation unit 190 may be realized by use of soft buttons in a touch panel on the display device 140.

The main memory 160 stores a printer control program and is utilized as a work area when the program is implemented; in the storage 170 which is a nonvolatile storage device, various kinds of template images, a color conversion table for head-hair processing, and the like are stored.

The printer engine 180, which employs, e.g., the TA (Thermo Autochrome) method as the printing method, makes a color printing paper sheet (hereinafter, referred to as "TA paper sheet") itself having respective coloring layers for C, M, and Y become colored, through heat treatment, and then fixes an image by irradiating a light beam of a predetermined wavelength onto the TA paper sheet. The printer engine 180 has a TA-paper-sheet transport device, a thermal head, a fixing lamp, and the like. In the case where a color image is printed on a TA paper sheet, in the first place, the TA paper sheet is transported and the thermal head is controlled by Y signal so as to make the yellow layer in the TA paper sheet become colored; in the second place, the yellow color is fixed by use of the fixing lamp. The magenta and cyan layers in the TA paper sheet are analogously made to become colored, based on M signal and C signal, respectively; then, the color image is printed on the TA paper sheet. In addition, the printer in the present embodiment is a TA printer; however, the present invention is not limited to a TA printer, but can be applied to other types of printers such as other types of thermal printers and an ink-jet printer.

Next, the head-hair processing in the image processing unit 120 will be explained.

Figure 2:
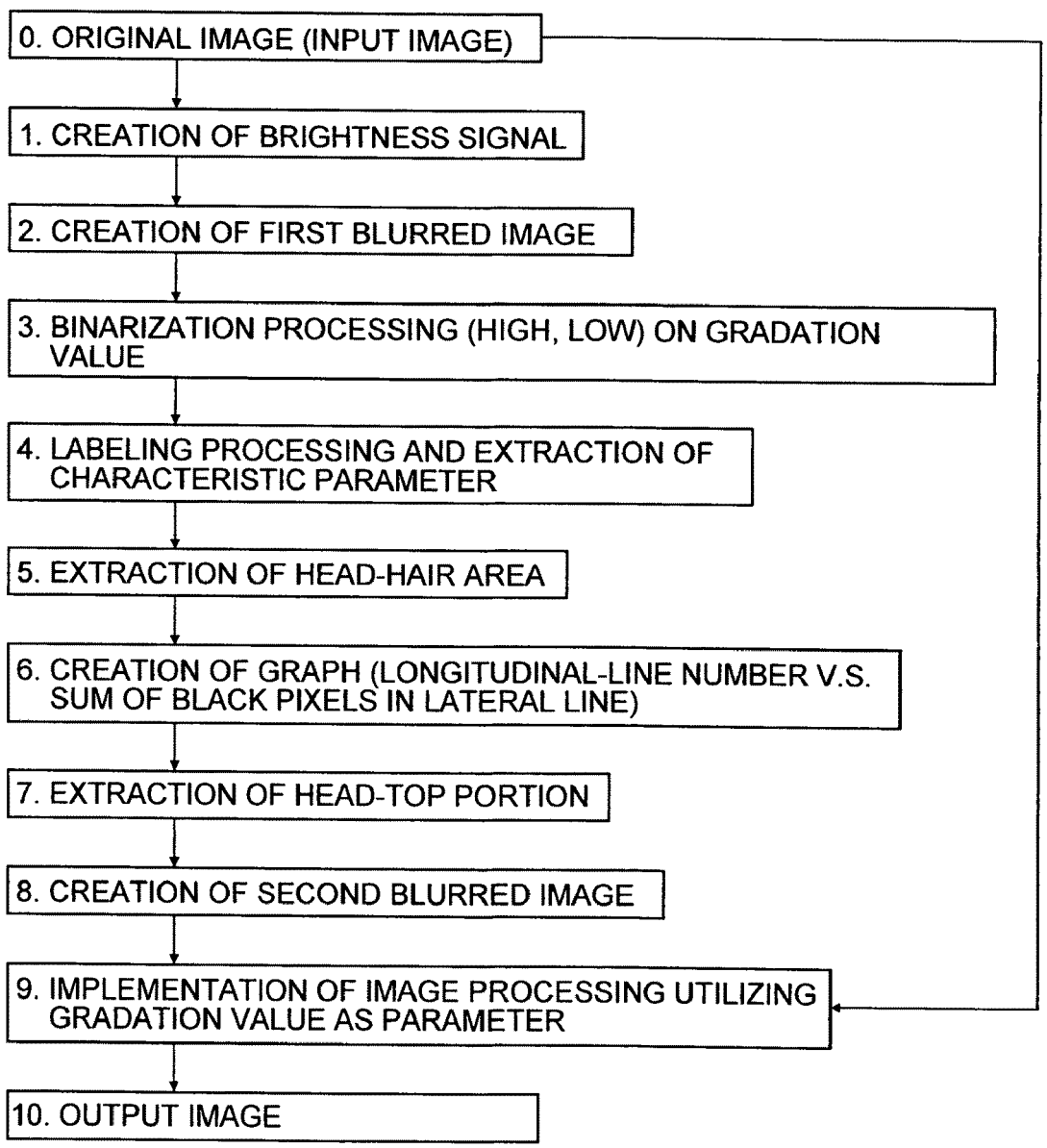
FIG. 2 is a flowchart representing the flow of the head-hair processing in the image processing unit illustrated in FIG. 1.

FIG. 2 is a flowchart representing the flow of the head-hair processing in the image processing unit 120.

[0. Original Image (Input Image)]

Figure 3A:
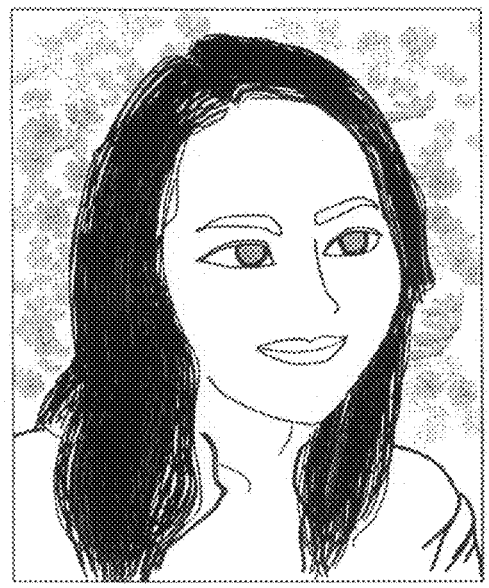
FIGS. 3A to 3D are views illustrating imaginary images for an input image, an output image, and respective images at processing stages.

Digital color image data (RGB data) for a person who has been shot by the camera unit 110 is inputted to the image processing unit 120. FIG. 3A is an imaginary image for the digital image data (an input image). Additionally, in the present embodiment, the size of an input image is a VGA (640×480 pixels) size.

[1. Creation of Brightness Signal]

The brightness signal Y is generated according to the following equation, based on the inputted RGB data.

$$Y = 0.3R + 0.6G + 0.1B \qquad \text{[Equation 1]}$$

In addition, regardless of [Equation 1], the brightness signal Y may be obtained according to other equations such as $Y=(5R+6G+5B)/16$ and $Y=(R+G+B)/3$.

[2. Creation of a First Blurred Image]

A brightness signal representing a blurred image is generated based on the generated brightness signal Y. As a generation method for the blurred image, for example, a method disclosed in Japanese Patent Application Laid-Open No. 2004-109642 can be utilized. In other words, ½ thinning-out processing is applied to the image corresponding to the brightness signal Y so as to create a downsized image, and then the downsized image is filtered by use of an IIR lowpass filter so as to create a blurred image. However, the filter for creating the blurred image is not limited to an IIR lowpass filter, but may be an FIR lowpass filter; what matters is that any filter may be utilized, as long as the filter digitally blurs an image.

The blurred image is enlarged twice so as to create a blurred image having the same image size as that of the original image. The blurred-image enlargement processing is implemented by creating a new pixel through interpolation with brightness data items of the neighboring pixels.

In addition, by, as described above, creating a blurred image based on a brightness signal Y, the blurred signal can satisfactorily be binarized in rear-stage binarization processing.

[3. Binarization Processing]

The blurred image created as described above is binarized so that image portions of deep colors (such as head hair and pupils) are separated from image portions of other colors (e.g., a skin color). In the present embodiment, the binarization is performed by utilizing 75-gradation, as a threshold value, with respect to a 256-gradation blurred image.

Figure 3B:
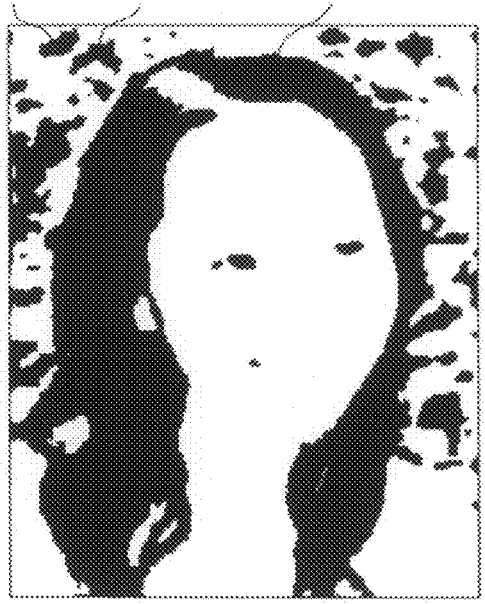

FIG. 3B is a binarized image obtained by applying the binarization processing to the blurred image. As illustrated in FIG. 3B, the deep-color areas, i.e., the head hair, the pupils, and the background are extracted as black-pixel areas.

[4. Labeling Processing and Extraction of Characteristic Parameter]

Labeling processing is applied to the foregoing binarized image. The labeling processing is achieved in such a way that black pixels (a connection area) which are connected with one another are extracted, and a specific number (label) is given to the connection area, while a different number is given to a different connection area (refer to FIG. 3B). In addition, when neighboring pixels are all black pixels, it suggests that the pixels are connected with one another. It is assumed that the label numbers to be given as labels are consecutive numbers from 1.

Respective characteristic parameters (such as an area and a shape) for the black-pixel connection areas, which are distinguished from one another by use of the label numbers, are obtained. The characteristic parameters are utilized as information items for extracting the head-hair area from a plurality of labeled connection areas.

[5. Extraction of Head-Hair Area]

In order to extract the head-hair connection area from the plurality of labeled connection areas, connection areas each having an area wider than a specific area are extracted by use of the characteristic parameters (areas) for connection areas.

Figure 3C:
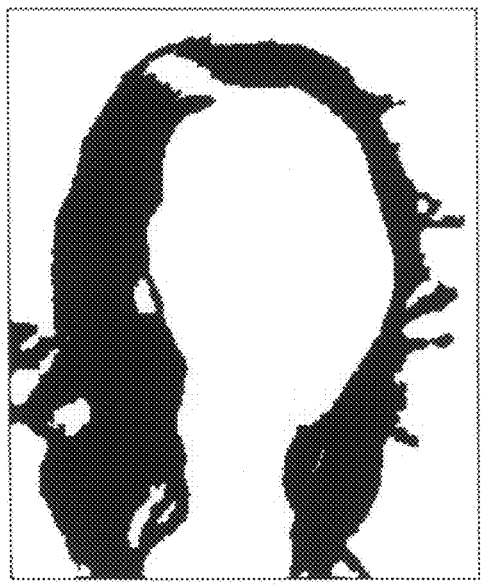

FIG. 3C is a binary image including only a connection area (head-hair area) that has an area wider than the specific area. As illustrated in FIG. 3C, in the binary image consisting of the head-hair area only, the connection areas of the pupils, the background, and the like are deleted, in contrast to the binary image in FIG. 3B.

In addition, in the case where, due to dark clothes or the like, a plurality of connection areas each having an area wider than a specific area can be extracted, a characteristic parameter such as a shape is further utilized so as to extract the head-hair connection area. Additionally, as the case where a plurality of connection areas are extracted, such a case is conceivable as a plurality of persons are included in an original image.

[6. Creation of Graph]

Figure 4A:
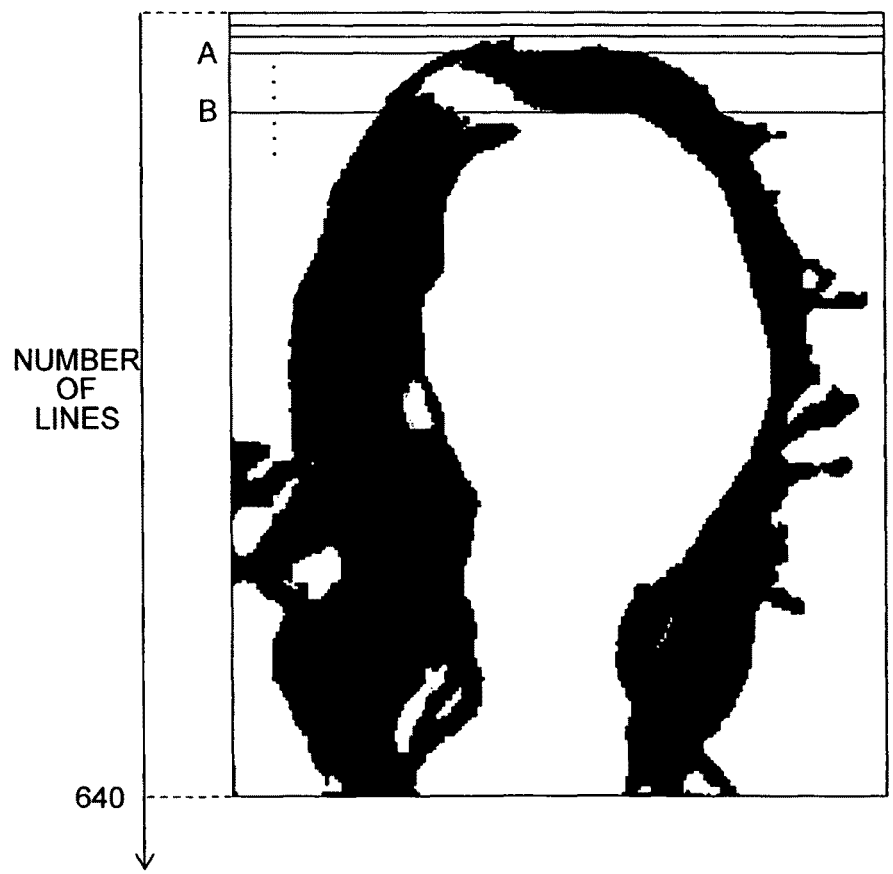
FIGS. 4A to 4B are a chart and a graph, respectively, for explaining a method of obtaining the head top and the boundary between the head hair and the forehead from a binary image in a head-hair area.
Figure 4B:
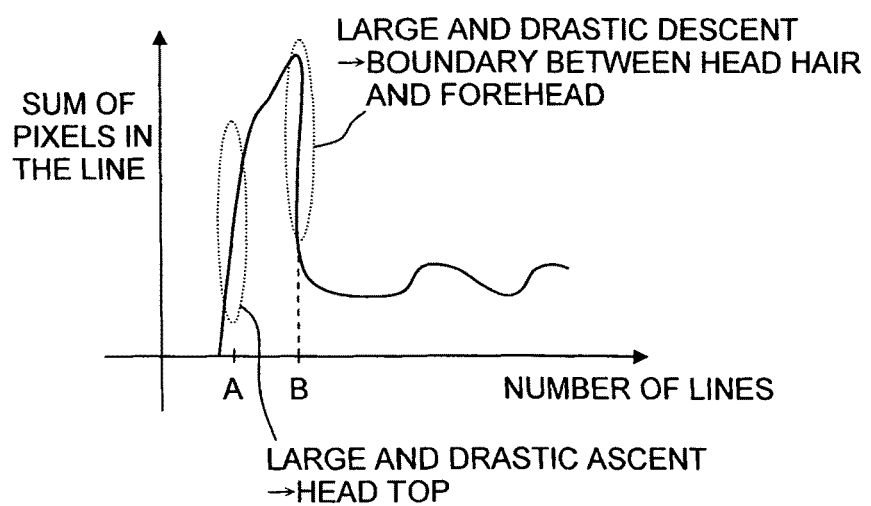

As illustrated in FIG. 4A, the binary image in the head-hair area is scanned so as to obtain the sum of black pixels in each horizontal line in the vertical direction, and then, as illustrated in FIG. 4B, a graph is created which represents the relationship between the number of the lines (line position) and the sum of black pixels in that line position. Incidentally, because the size of the binary image in the head-hair area is a VGA size, the number of all the lines in the vertical direction (longitudinal direction) is 640.

As is clear from the graph, the line position A where the sum of black pixels drastically increases corresponds to the position of the top of the head, and the line position B where the sum of black pixels drastically decreases corresponds to the position of the boundary between the head hair and the forehead.

By creating a graph (unillustrated) representing the difference between the respective sums of black pixels in the current line and the line immediately after the current line, the line position A where the sum of black pixels drastically increases and the line position B where the sum of black pixels drastically decreases, in the foregoing graph, can be obtained based on the maximal value and the minimal value, respectively, of the difference. In addition, before making the difference, noise is preferably reduced by use of a smoothing filter or the like.

[7. Extraction of Head-Top Portion]

FIG. 5 is a chart for explaining a method of obtaining the range, of the head-top portion, to which the head-hair processing is applied.

<Longitudinal Range of Head-Top Portion>

Figure 6:
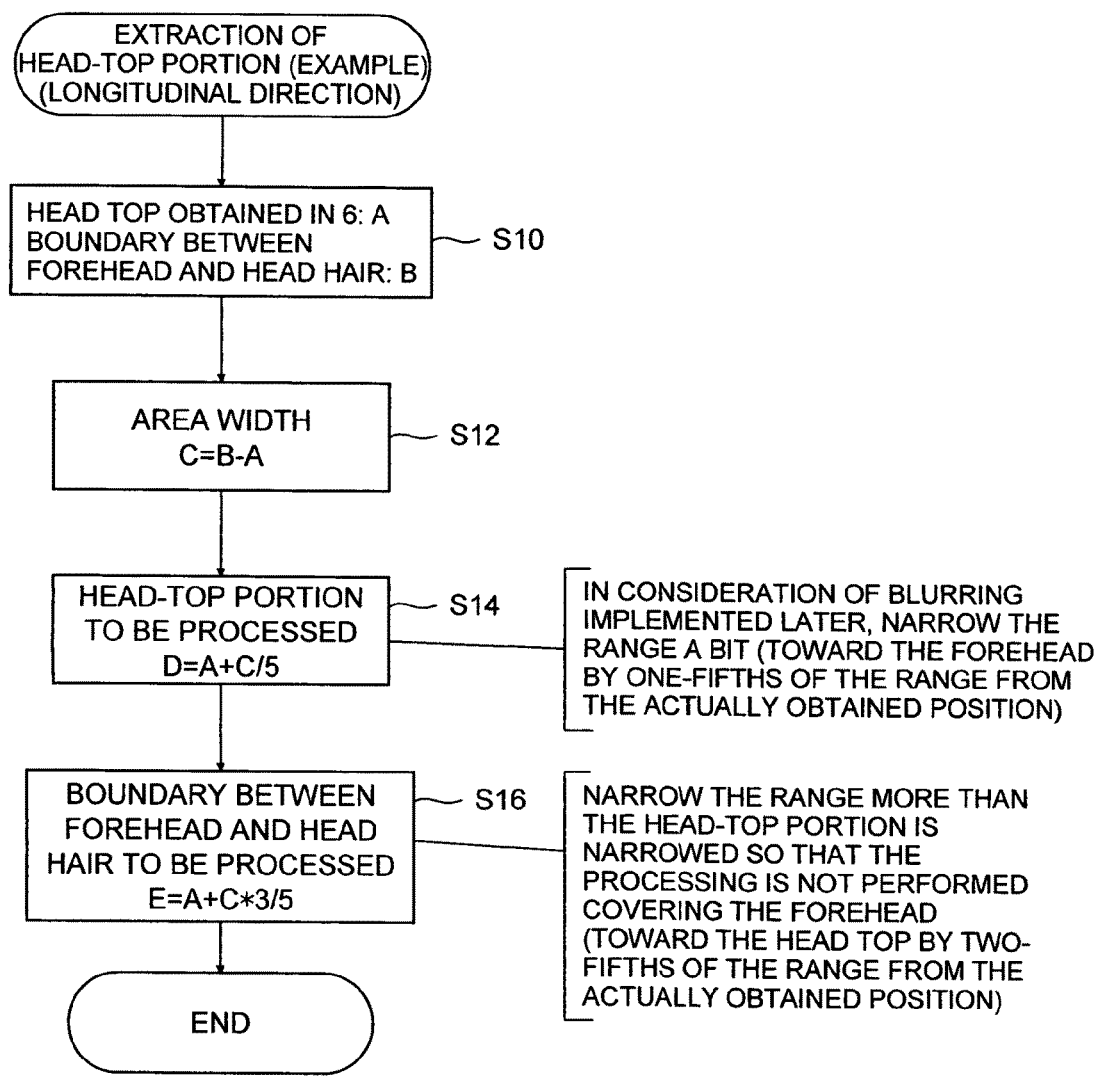
FIG. 6 is a flowchart representing a method of obtaining the longitudinal range of the head-top portion.

FIG. 6 is a flowchart representing a method of obtaining the longitudinal range of the head-top portion.

Figure 5A:
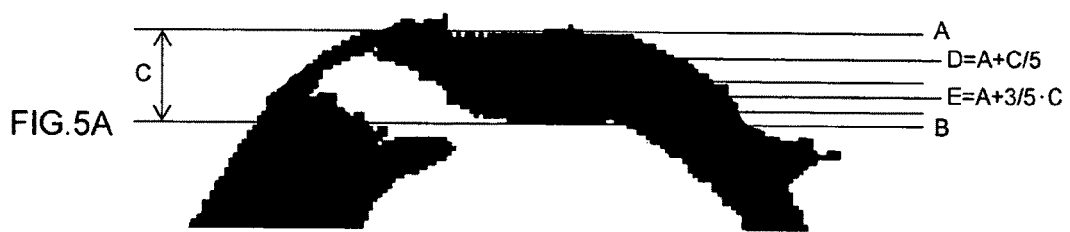
FIGS. 5A to 5E are charts for explaining a method of obtaining the range, of the head-top portion, to which the head-hair processing is applied.

Let A and B denote the position (line position) of the head top and the position (line position) of the boundary between the head hair and the forehead respectively, which are obtained from the graph in FIG. 4 (refer to the step S10 and FIG. 5A).

Subsequently, the longitudinal area width C (=B−A) is obtained (in the step S12). In other words, the area width C is obtained by subtracting the number of lines at the line position A from the number of lines at the line position B.

Based on the line position A and the area width C, the top-end position D and the bottom-end position E of the longitudinal range of the head-top portion are calculated according to the following equations (refer to the steps S14 and S16 and FIG. 5A):

$$D = A + C/5$$

$$E = A + C \times 3/5 \qquad \text{[Equation 2]}$$

The range between the position D and the position E calculated as described above is defined as a longitudinal range of the area, of the head-top portion, to which the head-hair processing is applied.

<Lateral Range of Head-Top Portion>

Figure 7:
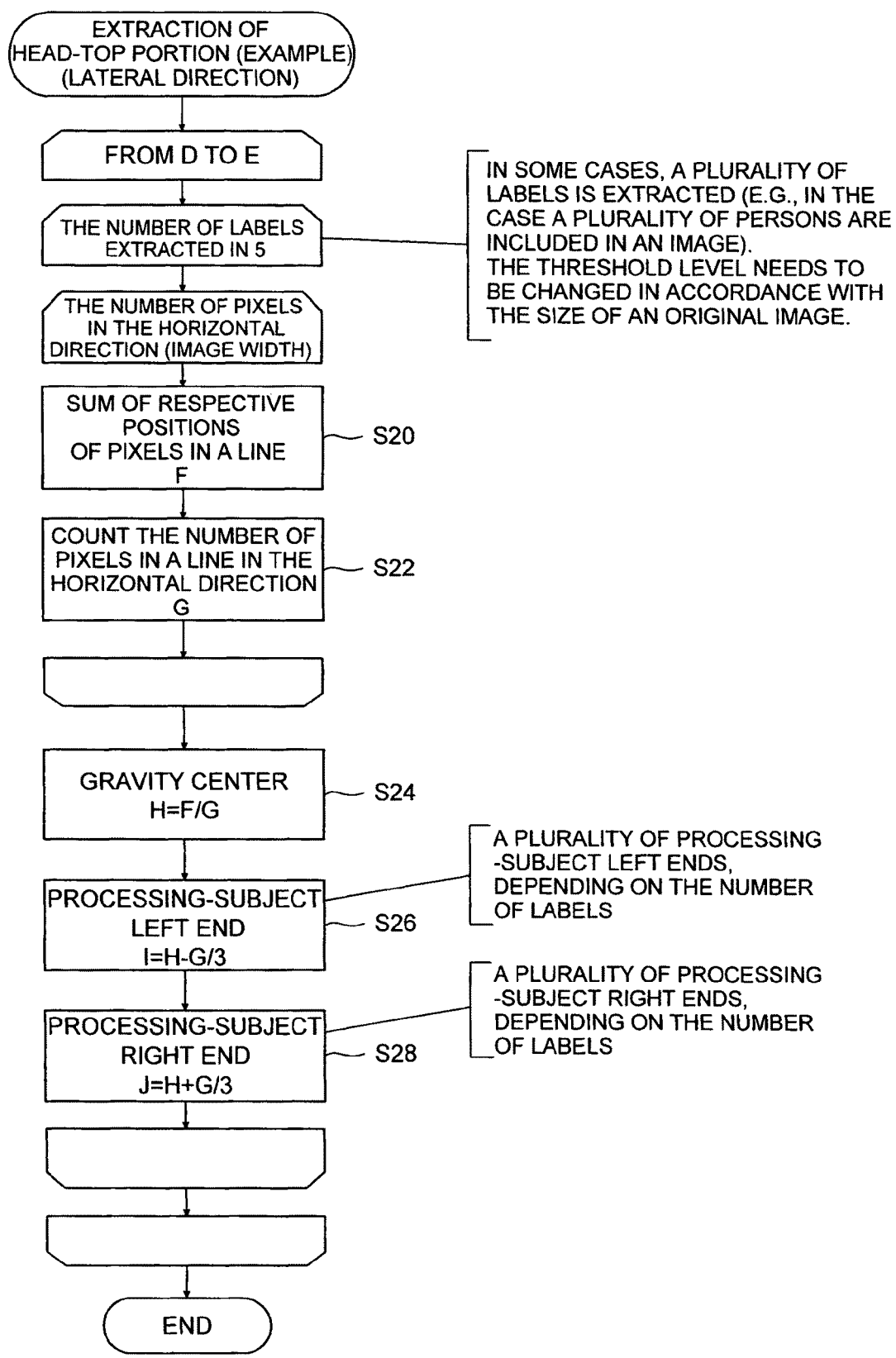
FIG. 7 is a flowchart representing a method of obtaining the lateral range of the head-top portion.

FIG. 7 is a flowchart representing a method of obtaining the lateral range of the head-top portion.

The following processing is applied to the longitudinal range (from the position D to the position E) of the area of a head-top portion to which head-hair processing is to be applied.

Figure 5B:
Figure 5C:
Figure 5D:

As illustrated in FIG. 5B, with regard to a specific line i in the range from the position D to the position E, the sum F of the respective positions of black pixels in the lateral direction and the number (image width) G of the black pixels are calculated (in the steps S20 and S22 in FIG. 7).

Next, based on the sum F of the respective positions of black pixels in the lateral direction and the number G of the black pixels obtained in the steps S20 and S22, the gravity position H for the line i is calculated according to the following equation (refer to the step S24 and FIG. 5C):

$$H = F/G \qquad \text{[Equation 3]}$$

Subsequently, based on the gravity position H calculated as described above and the number (image width) G of the black pixels calculated in the step S22, the left-end position I and the right-end position J of the lateral range of the head-top portion in the line i are calculated according to the following equations (refer to the steps S26 and S28 and FIG. 5D):

$$I = H - G/3$$

$$J = H + G/3 \qquad \text{[Equation 4]}$$

By applying the foregoing processing to each line in the range from the position D to the position E, the lateral range of the area of the head-top portion is obtained.

Figure 5E:

FIG. 5E is an area, of the head-top portion, which is defined by the longitudinal range explained in FIG. 6 and the lateral range explained in FIG. 7. The area, of the head-top portion, defined as described above falls within the area of the actual head hair; thus, it is possible to prevent the area of the head-top portion from including the background area.

[8. Creation of a Second Blurred Image]

The blurred image of the binary image in the area, of the head-top portion, extracted as described above is created. As is the case with the method of creating the first blurred image, the second blurred image can be created with respect to the binary image in the area of the head-top portion.

Additionally, as the method of creating the second blurred image, the moving-average method can be utilized. In the moving-average method, the average value of, e.g., 5 by 5 pixels around a target pixel is obtained, and it is assumed that the average value is the pixel value of the target pixel. Then, while moving pixel by pixel the target pixel over the whole area of the subject image, the average value of each target pixel is obtained.

Because the extracted area of the head-top portion is consisted of black pixels, it has a constant gradation value; however, the blurred image in the area of the head-top portion has a plurality of gradation values (dark and light), whereby the center portion of the area of the head-top portion becomes dark, and the peripheral portion becomes light. The gradation value of the blurred image is utilized as a parameter for image processing described later. As described above, in applying image processing to the area of the head-top portion, the smooth continuity between the area of the head-top portion and the other portion to which the image processing is not applied can be achieved, by blurring the area of the head-top portion.

[9. Implementation of Image Processing Utilizing Gradation Value as Parameter]

Image processing items such as color conversion, contrast enhancement, and edge enhancement are applied to the portion, of the input image, which is in the area of the created blurred image (the second blurred image), with the gradation value of the blurred image utilized as a parameter.

For example, the image portion in the area of the blurred image is color-converted (e.g., toward a brighter or whitish mage), and the degree of the color conversion is varied with the gradation value of the blurred image utilized as a parameter. By varying the degree of the color conversion with the gradation value of the blurred image utilized as a parameter (i.e., the center portion is strongly converted, and the peripheral portion is weakly converted), the smooth continuity between the color-converted image portion and the other portion that does not receive the image processing can be achieved/obtained.

As described above, by applying image processing such as color conversion to the image, in the area of the head-top portion (area of the blurred image), which is extracted from the input image, the glossiness of human head hair can be enhanced without utilizing any extra strobe system.

Figure 3D:
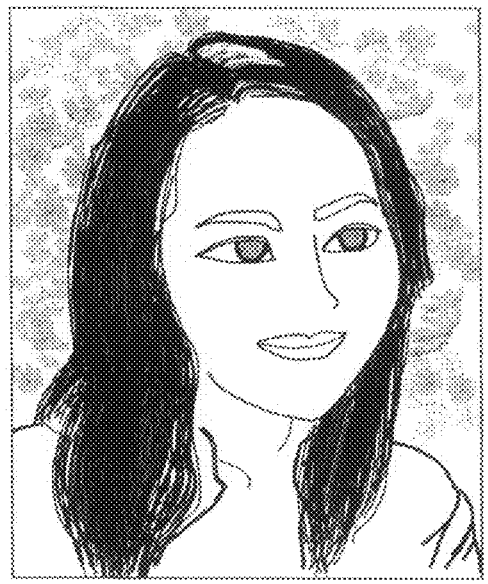

FIG. 3D is an output image obtained by applying the head-hair processing. In the output image, compared with the input image illustrated in FIG. 3A, the head-top portion becomes bright as if an appropriate illumination light beam was irradiated onto the top portion of the head hair, whereby the texture as well as the glossiness of the head hair is enhanced.

In addition, the image processing applied to the area of the top of the head hair is not limited to color conversion; another image processing such as contrast enhancement, edge enhancement, or the like may be utilized, or two or more image processing items may concurrently be implemented.

Additionally, the method of extracting the area of the head-top portion from the head-hair area that has been extracted from the input image is not limited to the present embodiment, and various methods are conceivable; for example, a method may be utilized in which a plurality of areas of head-top portions corresponding to the shapes of head-hair areas are preliminarily prepared in a storage, and based on the shape of the extracted head-hair area, the area of the corresponding head-top portion is read from the storage.

What is claimed is:

1. An image processing method, comprising the steps of:
   extracting an area of head hair from a digital image obtained by shooting a human face;
   extracting an area of a head-top portion based on the shape of the extracted area of head hair; and
   applying image processing, which enhances illumination effect on the head hair, to the digital image, by use of information on the extracted area of a head-top portion,
   wherein the step of extracting an area of a head-top portion includes:
   the step of obtaining the sum of black pixels, in a binary image that has black pixels only in the area of head hair, in each horizontal line in the vertical direction;
   the step of determining that a line position where the sum of black pixels drastically increases and a line position where the sum of black pixels drastically decreases are the position of the top of the head and the position of the boundary between the head hair and the forehead, respectively; and
   the step of obtaining the longitudinal range of the area of a head-top portion, based on the determined position of the top of the head and the determined position of the boundary between the head hair and the forehead.

2. The image processing method according to claim 1, wherein the step of extracting an area of head hair includes:
   the step of creating a blurred image based on the digital image;
   the step of creating a binary image by binarizing the created blurred image; and
   the step of extracting an area, having a characteristic parameter for head hair, which is a black-pixel area in the created binary image.

3. The image processing method according to claim 1, wherein the step of extracting an area of a head-top portion includes:
   the step of obtaining the sum of black pixels, in a binary image that has black pixels only in the area of head hair, in each horizontal line in the vertical direction;
   the step of determining that a line position where the sum of black pixels drastically increases and a line position where the sum of black pixels drastically decreases are the position of the top of the head and the position of the boundary between the head hair and the forehead, respectively;
   the step of obtaining the longitudinal range of the area of a head-top portion, based on the determined position of the top of the head and the determined position of the boundary between the head hair and the forehead;
   the step of obtaining, in the longitudinal range of the area of a head-top portion, the gravity center of black pixels in each line in the binary image; and
   the step of obtaining, as a lateral range of the area of the head-top portion, the length, with respect to the gravity center of each line, whose ratio to the length of black pixels in the line is constant.

4. An image processing method, comprising the steps of:
   extracting an area of head hair from a digital image obtained by shooting a human face;
   extracting an area of a head-top portion based on the shape of the extracted area of head hair; and
   creating a blurred image, based on an image in the extracted area of a head-top portion; and applying image processing, which enhances illumination effect on the head hair, to the digital image, by use of information on the created blurred image, wherein the step of extracting an area of a head-top portion includes:

the step of obtaining the sum of black pixels, in a binary image that has black pixels only in the area of head hair, in each horizontal line in the vertical direction;

the step of determining that a line position where the sum of black pixels drastically increases and a line position where the sum of black pixels drastically decreases are the position of the top of the head and the position of the boundary between the head hair and the forehead, respectively; and the step of obtaining the longitudinal range of the area of a head-top portion, based on the determined position of the top of the head and the determined position of the boundary between the head hair and the forehead.

5. The image processing method according to claim 4, wherein the step of applying image processing includes: applying at least one image processing item among image processing items including color conversion, contrast enhancement, and edge enhancement, to a digital image in the area of the created blurred image, with a gradation value of the created blurred image utilized as a parameter.

6. The image processing method according to claim 5, wherein the step of extracting an area of head hair includes:

the step of creating a blurred image based on the digital image;

the step of creating a binary image by binarizing the created blurred image; and the step of extracting an area, having a characteristic parameter for head hair, which is a black-pixel area in the created binary image.

7. The image processing method according to claim 6, wherein the step of extracting an area of a head-top portion includes:

the step of obtaining the sum of black pixels, in a binary image that has black pixels only in the area of head hair, in each horizontal line in the vertical direction;

the step of determining that a line position where the sum of black pixels drastically increases and a line position where the sum of black pixels drastically decreases are the position of the top of the head and the position of the boundary between the head hair and the forehead, respectively; and the step of obtaining the longitudinal range of the area of a head-top portion, based on the determined position of the top of the head and the determined position of the boundary between the head hair and the forehead.

8. The image processing method according to claim 6, wherein the step of extracting an area of a head-top portion includes:

the step of obtaining the sum of black pixels, in a binary image that has black pixels only in the area of head hair, in each horizontal line in the vertical direction;

the step of determining that a line position where the sum of black pixels drastically increases and a line position where the sum of black pixels drastically decreases are the position of the top of the head and the position of the boundary between the head hair and the forehead, respectively;

the step of obtaining the longitudinal range of the area of a head-top portion, based on the determined position of the top of the head and the determined position of the boundary between the head hair and the forehead;

the step of obtaining, in the longitudinal range of the area of a head-top portion, the gravity center of black pixels in each line in the binary image; and the step of obtaining, as a lateral range of the area of the head-top portion, the length, with respect to the gravity center of each line, whose ratio to the length of black pixels in the line is constant.

9. The image processing method according to claim 4, wherein the step of extracting an area of head hair includes:

the step of creating a blurred image based on the digital image;

the step of creating a binary image by binarizing the created blurred image; and the step of extracting an area, having a characteristic parameter for head hair, which is a black-pixel area in the created binary image.

10. The image processing method according to claim 4, wherein the step of extracting an area of a head-top portion includes:

the step of obtaining the sum of black pixels, in a binary image that has black pixels only in the area of head hair, in each horizontal line in the vertical direction;

the step of determining that a line position where the sum of black pixels drastically increases and a line position where the sum of black pixels drastically decreases are the position of the top of the head and the position of the boundary between the head hair and the forehead, respectively;

the step of obtaining the longitudinal range of the area of a head-top portion, based on the determined position of the top of the head and the determined position of the boundary between the head hair and the forehead;

the step of obtaining, in the longitudinal range of the area of a head-top portion, the gravity center of black pixels in each line in the binary image; and the step of obtaining, as a lateral range of the area of the head-top portion, the length, with respect to the gravity center of each line, whose ratio to the length of black pixels in the line is constant.

11. An image processing apparatus, comprising:

a head-hair area extracting device for extracting an area of head hair from a digital image obtained by shooting a human face;

a head-top-portion area extracting device for extracting an area of a head-top portion based on the shape of the extracted area of head hair; and an image processing device for applying image processing, which enhances illumination effect on the head hair, to the digital image, by use of information on the extracted area of a head-top-portion, wherein the head-top-portion area extracting device includes:

a device for obtaining the sum of black pixels, in a binary image that has black pixels only in the area of head hair, in each horizontal line in the vertical direction;

a device for determining that a line position where the sum of black pixels drastically increases and a line position where the sum of black pixels drastically decreases are the position of the top of the head and the position of the boundary between the head hair and the forehead, respectively; and a device for obtaining the longitudinal range of the area of a head-top portion, based on the determined position of the top of the head and the determined position of the boundary between the head hair and the forehead.

12. A printer comprising:
an image processing apparatus according to claim 11; and
a printing device which prints on a printing paper sheet an image to which the image processing apparatus has applied image processing.

13. The printer according to claim 12, further comprising:
a camera which obtains a digital image by shooting a person.

14. An image processing apparatus, comprising:
a head-hair area extracting device for extracting an area of head hair from a digital image obtained by shooting a human face;
a head-top-portion area extracting device for extracting an area of a head-top portion based on the shape of the extracted area of head hair;
a blurred image creation device for creating a blurred image, based on an image in the extracted area of a head-top portion; and
an image processing device for applying image processing, which enhances illumination effect on the head hair, to the digital image, by use of information on the created blurred image,
wherein the head-top-portion area extracting device includes:
a device for obtaining the sum of black pixels, in a binary image that has black pixels only in the area of head hair, in each horizontal line in the vertical direction;
a device for determining that a line position where the sum of black pixels drastically increases and a line position where the sum of black pixels drastically decreases are the position of the top of the head and the position of the boundary between the head hair and the forehead, respectively; and
a device for obtaining the longitudinal range of the area of a head-top-portion, based on the determined position of the top of the head and the determined position of the boundary between the head hair and the forehead.

15. The image processing apparatus according to claim 14, wherein, the image processing device applies at least one image processing item among image processing items including color conversion, contrast enhancement, and edge enhancement to a digital image in the area of the created blurred image, with a gradation value of the created blurred image utilized as a parameter.

16. A printer comprising:
an image processing apparatus according to claim 15; and
a printing device which prints on a printing paper sheet an image to which the image processing apparatus has applied image processing.

17. The printer according to claim 16, further comprising:
a camera which obtains a digital image by shooting a person.

18. A printer comprising:
an image processing apparatus according to claim 14; and
a printing device which prints on a printing paper sheet an image to which the image processing apparatus has applied image processing.

19. The printer according to claim 18, further comprising:
a camera which obtains a digital image by shooting a person.

* * * * *